United States Patent [19]

Ueno et al.

[11] Patent Number: 4,596,981
[45] Date of Patent: Jun. 24, 1986

[54] SYNCHRONIZING SIGNAL DETECTING CIRCUIT IN A DIGITAL SIGNAL TRANSMITTING SYSTEM

[75] Inventors: Shoji Ueno, Zama; Kazunori Nishikawa, Machida; Yoshiki Iwasaki, Yokohama; Isao Masuda, Sagamihara; Makoto Komura, Tokyo, all of Japan

[73] Assignee: Victor Company of Japan, Ltd., Yokohama, Japan

[21] Appl. No.: 615,237

[22] Filed: May 29, 1984

[30] Foreign Application Priority Data

May 30, 1983 [JP] Japan ................................ 58-95337

[51] Int. Cl.[4] .............................................. H04L 7/00
[52] U.S. Cl. ................................. 340/825.2; 370/100; 375/106; 375/113; 375/116
[58] Field of Search ..................... 340/825.2; 370/100, 370/108; 375/106, 113, 114, 116; 358/319; 328/63

[56] References Cited

U.S. PATENT DOCUMENTS

| | | | |
|---|---|---|---|
| 3,586,776 | 6/1971 | Salava | 375/116 |
| 4,214,124 | 7/1980 | Jarus | 375/114 |
| 4,356,566 | 10/1982 | Wada et al. | 375/116 |
| 4,414,677 | 11/1983 | Ive et al. | 375/116 |

Primary Examiner—Ulysses Weldon
Assistant Examiner—Ralph Smith
Attorney, Agent, or Firm—Michael N. Meller

[57] ABSTRACT

A synchronizing signal detecting circuit is used in a digital signal transmitting system which transmits a digital signal in which signals are time-sequentially multiplexed in terms of blocks, where each of the blocks are made up of digital data which are information signals subjected to a digital modulation, a synchronizing signal having a fixed pattern, and an error checking code arranged at a location separated from a location of the synchronizing signal by a predetermined number of bits. The synchronizing signal detecting circuit comprises a counter which is reset when a synchronizing signal detection output which has been discriminated as being correct by use of the error checking code is continuously obtained for N times, where N is a natural number greater than or equal to two.

5 Claims, 6 Drawing Figures

SYNCHRONIZING SIGNAL DETECTING CIRCUIT IN A DIGITAL SIGNAL TRANSMITTING SYSTEM

BACKGROUND OF THE INVENTION

The present invention generally relates to synchronizing signal detecting circuits in digital signal transmitting systems, and more particularly to a synchronizing signal detecting circuit for accurately detecting a synchronizing signal from digital signals which are time-sequentially multiplexed and transmitted in terms of blocks (frames), where each block comprises a synchronizing signal and digital data.

Systems have been reduced to practice for recording information signals on a spiral track on an information signal recording medium (hereinafter simply referred to as a disc) as rows of time-sequential and intermittent pits, and for reproducing the recorded information signals from such a disc. The recorded information signals are reproduced from the disc as variations in the electrostatic capacitance between the disc and an electrode of a reproducing element, or are reproduced from the disc by use of the variation in the intensity of light reflected from or transmitted through the disc. The information signals may be made up sole of digital audio signals, or may be made up of digital audio signals and a digital video signal which is related to a still picture or a partially moving picture and is added to the digital audio signals as a supplementary information. As will be described later on in the specification in conjunction with the drawings, the digital signals are transmitted in terms of blocks (frames) in such systems. In one block, an 8-bit synchronizing signal having a fixed pattern for indicating the beginning of a block (frame), four channels of digital data (data related solely to the digital audio signals or data related to the digital audio signals and the digital video signal, as described before) each having 16 bits and arranged subsequent to the 8-bit synchronizing signal, two 16-bit error correcting codes, a 23-bit error checking code (cyclic redundancy check code), a 1-bit data corresponding to one bit of a control signal having a total of 196 bits, for example, and a 2-bit spare data often referred to as user's bits, are time-sequentially and successively arranged.

One block (frame) of the digital signals from the synchronizing signal bits to the user's bits, amount to a total of 130 bits. The digital signals have a repetition frequency of 44.1 kHz which is the same as the sampling frequency, for example. The digital signals are transmitted serially at a transmission bit rate of 5.733 Mb/sec, by being time-sequentially multiplexed in terms of blocks (frames). The time-sequentially multiplexed digital signal is an NRZ (non return to zero) signal. This NRZ signal is subjected to a self-clocking digital modulation such as an MFM (modified frequency modulation) or a PM (3-position modulation, or is subjected to a data scrambling by performing a modulo-2 addition with an M-sequence (maximum length sequence) code. The NRZ signal which is subjected to the digital modulation or the data scrambling, is further subjected to a frequency modulation, or the NRZ signal is simply subjected to a frequency modulation without being subjected to the digital modulation. The modulated digital signal is recorded on the disc as rows of intermittent pits by use of a light beam or the like.

In a reproducing apparatus which plays the disc described heretofore, a reproduced digital signal is obtained by subjecting a signal which is reproduced from the disc to a frequency demodulation. The reproduced digital signal has the construction described before. A high-frequency clock signal (having a frequency in the range of 5.733 MHz, for example) which is in phase with the reproduced digital signal, is reproduced from the reproduced digital signal in a clock reproducing circuit. The detection of the synchronizing signal within the reproduced digital signal and the write-in of data into a memory circuit, are performed based on the reproduced clock signal.

A data (false synchronizing signal) having the same pattern as the synchronizing signal, sometimes exists in a signal duration of the digital signals excluding the duration of the synchronizing signal. Conventionally, in a synchronizing signal detecting circuit in a system which transmits the digital signals, the above false synchronizing signal was erroneously detected as it were the synchronizing signal. Consequently, there was a problem in that it was impossible to correctly demodulate the data because of the erroneous detection of the synchronizing signal. In addition, there was a conventional synchronizing signal detecting circuit which employed a counter and was designed to detect the synchronizing signal with a constant period even when a dropout occurred in the synchronizing signal. However, this conventional synchronizing signal detecting circuit also detected the false synchronizing signal, and resulted in an erroneous resetting of the counter when such an erroneous detection was performed. In other words, the false synchronizing signal was erroneously detected as it were the synchronizing signal, and there was a problem in that the data could not be demodulated correctly.

SUMMARY OF THE INVENTION

Accordingly, it is a general object of the present invention to provide a novel and useful synchronizing signal detecting circuit in a digital signal transmitting system, in which the problems described heretofore have been eliminated.

Another and more specific object of the present invention is to provide a synchronizing signal detecting circuit in a digital signal transmitting system, comprising a counter which is reset when a synchronizing signal detection output which has been discriminated as being correct by use of an error checking code is continuously obtained N times, where N is an integral number greater than or equal to two. According to the synchronizing signal detecting circuit of the present invention, the problems described before are eliminated, by producing an output of the counter as a synchronizing signal detection signal.

Still another object of the present invention is to provide a synchronizing signal detecting circuit in a digital signal transmitting system, comprising a first detecting circuit supplied with a digital signal, for detecting a signal having the same fixed pattern as the synchronizing signal within the digital signal, an error checking circuit for essentially detecting whether the synchronizing signal is correct by use of an error checking code within the digital signal at a point which is a transmitting duration of a predetermined number of bits after a point when a detection signal was produced from the first detecting circuit, a first counter for counting pulses in a clock signal which is extracted from the digital signal, a first decoder for producing from a counted output of the first counter a signal having a period which is substantially equal to the period of the signal of one block, counting means reset responsive to an output signal of the error checking circuit when the error checking circuit detects that the synchronizing signal is correct, for counting pulses in a signal which is obtained from an output signal of the first counter and has a period which is substantially equal to the period of the signal of one block, delay means supplied with a counted output of the countinq means, for producing a pulse signal which has been delayed by a predetermined delay time from a point when the counted output of the counting means becomes equal to M, where M is an integral number greater than or equal to 2, resetting means for resetting the first counter responsive to the output detection signal of the first detecting circuit immediately after the delay means produces an output pulse signal or immediately after the first decoder produces an output signal, a second detecting circuit for detecting that the output signals of the first detecting circuit and the first decoder coincide N times for every period of the signal of one block in a state where the value of the counted output of the counting means is zero, where N is an integral number greater than or equal to 2, a second counter reset responsive to the output detection signal of the first detecting circuit in a duration in which a detection signal is produced from the second detecting circuit, for counting pulses in the clock signal, and a second decoder for decoding a counted output of the second counter, and for producing a synchronizing signal detection signal.

According to the synchronizing signal detecting circuit of the present invention, the counting means is reset responsive to a detection output of the error checking circuit during a normal reproduction in which the synchronizing signal is reproduced normally. The first counter is reset responsive to the output signal of the first detecting circuit. In a state where the counted value in the counter means is zero, the second counter is reset responsive to the output detection signal of the first detecting circuit only then the output signal of the first detecting circuit and the output signal of the first decoder coincide N times for every period of the signal of one block. Hence, even when the data other than the synchronizing signal has the same fixed pattern as the synchronizing signal, that is, even when a false synchronizing signal exists, the error checking circuit essentially detects whether the synchronizing signal is correct, and the detection to determine whether the synchronizing signal is correct is repeated when the synchronizing signal is incorrect. As a result, the false synchronizing signal will not be detected as it were the synchronizing signal. The false synchronizing signal does not occur frequently, however, when it does occur, it occurs periodically. The first counter supplies the counted output thereof to the first decoder which produces a reset pulse which determines the operating timing of the error checking circuit. When the error checking circuit detects an error in the synchronizing signal continuously for M times, the first counter is reset responsive to the output detection signal of the first detecting circuit subsequent to the pulse signal which has been delayed by the predetermined delay time. Therefore, the synchronizing signal detecting circuit is positively prevented from synchronizing to the false synchronizing signal. As a result, even when the false synchronizing signal does exist, the synchronizing signal detection signal which is in phase with the reproduced synchronizing signal, can be produced from the counted output of the second counter which counts the pulses in the clock signal, with a high precision. In addition, even when a dropout occurs in a part of the reproduced synchronizing signal, the second counter operates based on the detection signal of the first detecting circuit with the correct period before the occurrence of the dropout. As a result, it is possible to produce the synchronizing signal detection signal having the correct period from the counted output of the second counter, and accordingly, it is possible to constantly and correctly obtain the digital data within the digital signal.

Other objects and further features of the present invention will be apparent from the following detailed description when read in conjunction with the accompanying drawings.

DETAILED DESCRIPTION

Figure 1:
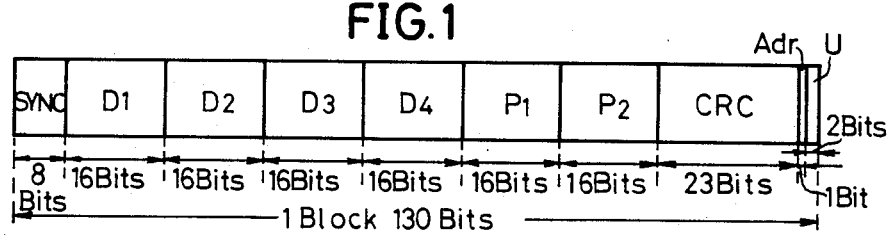
FIG. 1 shows an example of an arrangement of bits in digital signals including a synchronizing signal which is to be detected in a synchronizing signal detecting circuit according to the present invention.

An example of an arrangement of bits in digital signals which are transmitted in a digital signal transmitting system in which a synchronizing signal detecting circuit according to the present invention is employed, is shown in FIG. 1. In FIG. 1, an 8-bit synchronizing signal which has a fixed pattern and indicates the beginning of a block (frame), is arranged at a location SYNC. Four channels of digital data (data related solely to the digital audio signals or data related to the digital audio signals and the digital video signal, as described before) each having 16 bits, are respectively arranged at locations $D_1$ through $D_4$ subsequent to the synchronizing signal. Two 16-bit error correcting codes are respectively arranged at locations $P_1$ and $P_2$ subsequent to the digital data arranged at the location $D_4$, and a 23-bit error checking code (cyclic redundancy check code) is arranged at a location CRC subsequent to the error correcting code which is arranged at the location $P_2$. A 1-bit data related to one bit of a control signal having a total of 196 bits, for example, is arranged at a location Adr subsequent to the error checking code. A 2-bit spare data which is often referred to as user's bits, are arranged at a location U subsequent to the user's bits. In other words, the synchronizing signal bits through the user's bits are successively and time-sequentially arranged at the locations within one block as shown in FIG. 1.

One block (frame) of the digital signals from the synchronizing signal bits to the user's bits, amount to a total of 130 bits. The digital signals have a repetition frequency of 44.1 kHz which is the same as the sampling frequency, for example. The digital signals are transmitted serially at a transmission bit rate of 5.733 Mb/sec, by being time-sequentially multiplexed in terms of blocks (frames). The time-sequentially multiplexed digital signal is an NRZ (non return to zero) signal. This NRZ signal is subjected to a self-clocking digital modulation such as an MFM (modified frequency modulation) or a 3 PM (3-position modulation, or is subjected to a data scrambling by performing a modulo-2 addition with an M-sequence (maximum length sequence) code. The NRZ signal which is subjected to the digital modulation or the data scrambling, is further subjected to a frequency modulation, or the NRZ signal is simply subjected to a frequency modulation without being subjected to the digital modulation. The modulated digital signal is recorded on a disc as rows of intermittent pits by use of a light beam or the like.

In a reproducing apparatus which plays the disc described above, a reproduced digital signal is obtained by subjecting a signal which is reproduced from the disc to a frequency demodulation. The reproduced digital signal has the construction described before. A high-frequency clock signal (having a frequency in the range of 5.733 MHz, for example) which is in phase with the reproduced digital signal, is reproduced from the reproduced digital signal in a clock reproducing circuit. The detection of the synchronizing signal within the reproduced digital signal and the write-in of data into a memory circuit, are performed based on the reproduced clock signal.

Figure 2:
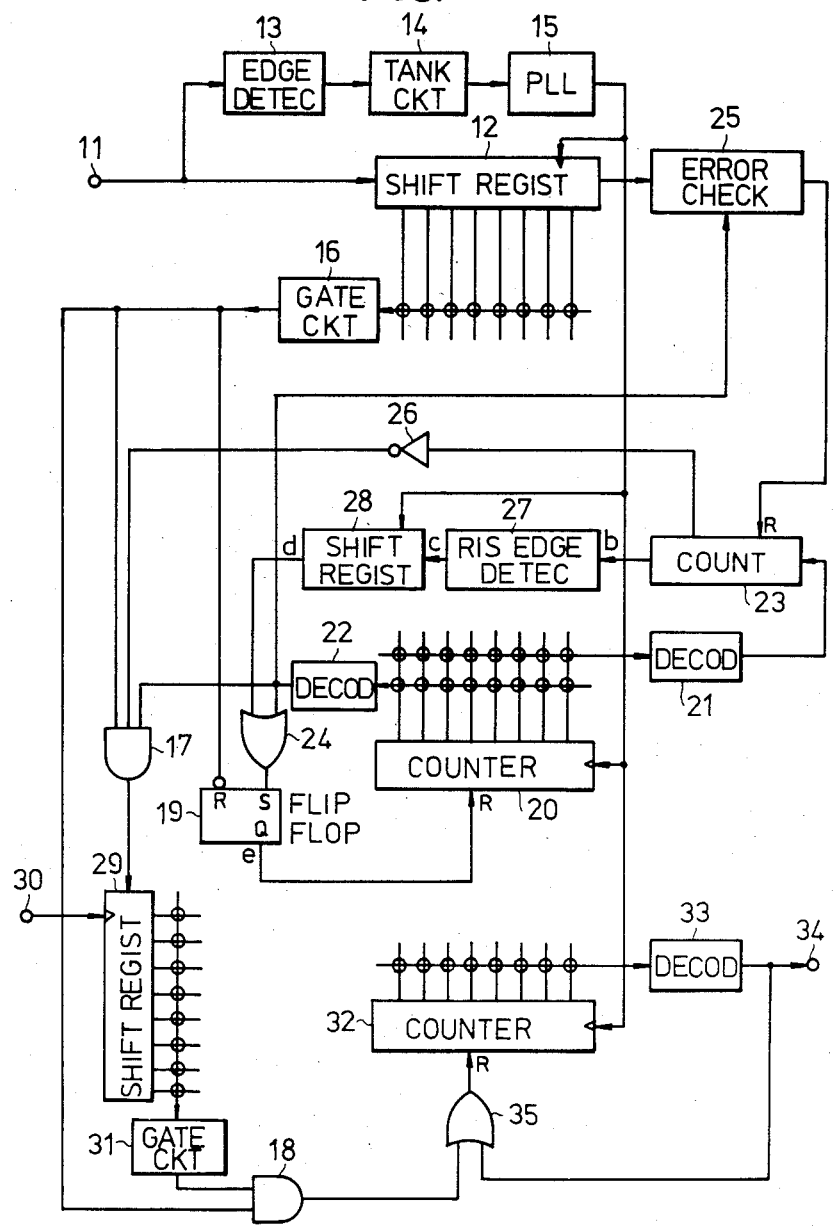
FIG. 2 is a systematic block diagram showing an embodiment of a synchronizing signal detecting circuit according to the present invention.
Figure 4:
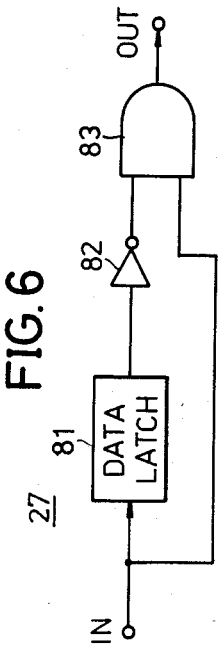
FIG. 4 shows an example of a concrete circuit of an edge detecting circuit in the block system shown in FIG. 2.

Next, description will be given with respect to an embodiment of a synchronizing signal detecting circuit according to the present invention, by referring to FIG. 2. In FIG. 2, a reproduced digital signal which is reproduced from the disc and is frequency-demodulated into the signal having the signal format in terms of blocks as shown in FIG. 1, is applied to an input terminal 11. This reproduced digital signal is supplied to an 8-bit shift register 12 which has the same number of bits as the synchronizing signal arranged at the location SYNC in FIG. 1, and to an edge detecting circuit 13. As shown in FIG. 4, the edge detecting circuit 13 comprises an exclusive-OR gate 51, a resistor R, and a capacitor C. An input pulse signal is directly applied to one input terminal of the exclusive-OR gate 51, and the input pulse signal is delayed by a delay time determined by the resistor R and the capacitor C before being applied to the other input terminal of the exclusive-OR gate 51. Accordingly, the exclusive-Or gate 51 produces a detection pulse signal which is responsive to the rising and falling edges (leading and trailing edges) of the input pulse signal. The output detection pulse signal of the edge detecting circuit 13 is supplied to a tank circuit 14. The tank circuit 14 is designed to tune in to a frequency which is an integral multiple of the transmission bit rate (that is, to tune in to a frequency of 5.733 MHz in a case where the integral multiple is equal to unity, for example). Thus, the tank circuit 14 produces a sinusoidal wave which is in phase with the rising and falling edges of the reproduced digital signal and has a frequency of 5.733 MHz, for example, and supplies this sinusoidal wave to a phase locked loop (PLL) 15. When a time base deviation exists in the reproduced digital signal due to causes such as unstable rotation of the disc, this time base deviation is also included in the output sinusoidal wave of the tank circuit 14. The PLL absorbs the time base deviation in the output sinusoidal wave of the tank circuit 14, and performs a dropout compensation so as to produce a pulse signal having a frequency of 5.733 MHz, for example, as a clock signal.

The shift register 12 receives the clock signal from the PLL 15 as a latch pulse (shift pulse). The shift register 12 temporarily stores the reproduced digital signal which is serially obtained through the input terminal 11, and supplies the 8-bit stored data in parallel to a gate circuit 16 responsive to the latch pulse. The gate circuit 16 produces a detection signal having a logic level "1" when the value of the incoming 8-bit data is identical to the value of the 8-bit fixed pattern of the synchronizing signal, and otherwise produces a detection signal having a logic level "0". Accordingly, a pulse having a logic level "1" and a constant pulse width is normally obtained from the gate circuit 16, at a point in time when the eighth bit of the synchronizing signal is supplied to the shift register 12. The shifting operation is carried out in the shift register 12 responsive to the clock signal from the tank circuit 14, and the value of the 8-bit parallel data in the shift register 12 is renewed for every one period of the clock signal. Hence, the pulse width of the output of the gate circuit 16 is equal to one period of the clock signal. The output of the gate circuit 16 is supplied to AND circuits 17 and 18, and to a reset terminal of a flip-flop 19 so as to reset the flip-flop 19 with a falling edge thereof.

When the flip-flop 19 is reset, the flip-flop 19 produces a signal having a logic level "0" through a Q-output terminal thereof. A first counter 20 is reset responsive to a rising edge of this Q-output of the flip-flop 19. The first counter 20 counts the pulses in the clock signal from the PLL 15, and supplies a counted output to decoders 21 and 22. The decoders 21 and 22 each produce a pulse signal having a logic level "1" when the counted value in the first counter 20 becomes equal to the number of pulses in the clock signal which is transmitted in one block transmitting duration (a duration in which 130 bits are transmitted). The decoder 21 produces a pulse signal which is in phase with the last bit (twenty-third bit) of the error checking code in the reproduced digital signal which is obtained from the input terminal 11. The error checking code is arranged at the location CRC as described before in conjunction with FIG. 1. On the other hand, the decoder 22 produces a pulse signal which is in phase with the last bit (eighth bit) of the synchronizing signal which is arranged at the location SYNC shown in FIG. 1. The output pulse signal of the decoder 21 is supplied to a counter 23 wherein the number of pulses in the output pulse signal of the decoder 21 is counted. The output pulse signal of the decoder 22 is supplied to the AND circuit 17, an OR circuit 24, and an error checking circuit 25.

The error checking circuit 25 receives the output pulse signal of the decoder 22 as a reset pulse. Further, the error checking circuit 25 receives the reproduced digital signal through the shift register 12. The error checking circuit 25 latches a total of 119 bits of data (that is, the data which are arranged at the locations $D_1$ through $D_4$, $P_1$, $P_2$, and CRC shown in FIG. 1 and are transmitted during a normal reproduction) immediately after receipt of the reset pulse, and divides the latched data by a predetermined producing polynomial so as to obtain a remainder. The error checking code arranged at the location CRC is a 23-bit remainder which is obtained when the data arranged at the locations $D_1$ through $D_4$, $P_1$ and $P_2$ are divided by a predetermined producing polynomial of $X^{23}+X^5+X^4+X+1$. Accordingly, when the above 119-bit data is divided by the same producing polynomial which was used at the time of the recording and the remainder is zero, the error checking circuit 25 discriminates that there is no error in the data. On the other hand, when there is a remainder, the error checking circuit 25 discriminates that there is an error in the data. When there is an error in the data, there is an error in the synchronizing signal in most cases. In other words, when there is no error in the data, there usually is no error in the synchronizing signal. Thus, when the existence of the error in the data is detected in the error checking circuit 25, the existence of the error in the synchronizing signal is being indirectly detected at the same time. When there is no error in the data, it is discriminated that there is no error in the synchronizing signal (that is, it is discriminated that the synchronizing signal is correct), and the error checking circuit 25 produces a pulse having a logic level "1", for example, in phase with the last bit of the error checking code. This output pulse of the error checking circuit 25 is supplied to the counter 23 so as to reset this counter 23. On the other hand, when there is an error in the data, it is discriminated that there is an error in the synchronizing signal, and the error checking circuit 25 continues to produce a signal having a logic level "0". Therefore, the counter 23 is not reset when there is an error in the synchronizing signal.

Figure 5:
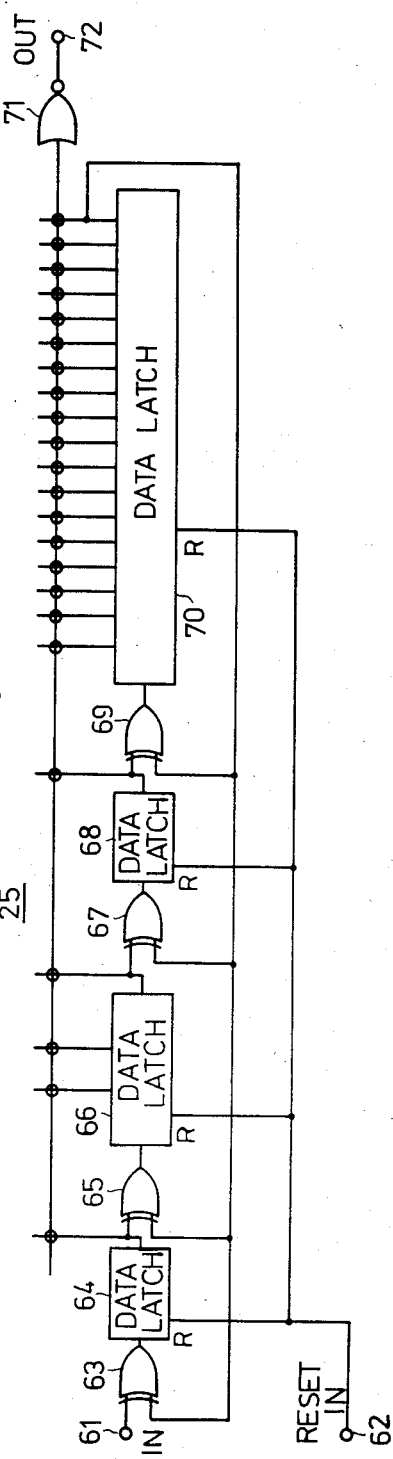
FIG. 5 shows an example of a concrete circuit of an error checking circuit in the block system shown in FIG. 2.

An embodiment of a concrete circuit construction of the error checking circuit 25, is shown in FIG. 5. The circuit construction of the error checking circuit 25 shown in FIG. 5 is well known, and the error checking circuit 25 comprises exclusive-OR gates 63, 65, 67, and 69, data latches 64 and 68 for providing a delay of one clock pulse, a data latch 66 for providing a delay of three clock pulses, a data latch 70 for providing a delay of eighteen clock pulses, and an OR gate 71. When an input "1" is applied to an input terminal 61, a term X is produced from the data latch 64, a term $X^4$ is produced from the data latch 66, a term $X^5$ is produced from the data latch 68, and a term $X^{23}$ is produced from the data latch 70. A reset pulse is applied to a terminal 62 from the decoder 22. This error checking circuit 25 divides the input signal by a polynomial $G(X)=X^{23}+X^5+X^4+X+1$. The signal which is transmitted, is added with a remainder which is obtained when the signal is divided by the polynomial G(X), when the signal is being transmitted. Accordingly, when an error exists in the transmitted signal, a detection result at an output terminal 72 does not become equal to zero, and the error in the signal can be detected. In the present embodiment, the error checking circuit 25 has 23 bits, however, a commercially available 16-bit integrated circuits (ICs) may be used for the error checking circuit 25. For example, a CRCC (cyclic redundancy check code) IC chip 8X01 manufactured by Signetics or a CRCC IC chip 9401 manufactured by Fairchild, for example, may be used for the error checking circuit 25.

Accordingly, during the normal reproduction, that is, when 8 continuous bits of data, other than the synchronizing signal in one block, does not assume the same value as the synchronizing signal, the output pulse signal from the decoder 21 and the reset pulse from the error checking circuit 25 are respectively supplied to the counter 23 with the same timing. Thus, in this case, the counted value in the counter 23 is zero. A signal in the least significant bit (LSB), for example, of the counted output of the counter 23 is constantly converted into a signal having a logic level "1" in an inverter 26. This output signal of the inverter 26 having the logic level "1" is supplied to the AND circuit 17. In addition, during the normal reproduction, the counted output signal b of the counter 23 constantly assumed a logic level "0", and this counted output signal b is supplied to an edge detecting circuit 27 of which output c is supplied to a shift register 28. As a result, an output signal d of the shift register 28 also constantly assumes a logic level "0". The output signal d of the shift register 28 is passed through the OR circuit 24 together with the output pulse signal of the decoder 22, and the output signal of the OR circuit 24 is applied to a set terminal of the flip-flop 19. The flip-flop 19 is set responsive to a rising edge of the output signal of the OR circuit 24.

Accordingly, immediately after the disc is played, the timing with which the gate circuit 16 produces an output pulse signal does not coincide with the timing with which the decoder 22 produces an output pulse signal. However, after the gate circuit 16 produces the detection signal, the gate circuit 16 and the decoder 22 during the normal reproduction simultaneously produce a pulse signal which is in phase with the last bit of the synchronizing signal within the reproduced digital signal, has a period equal to the period of the signal of one block, and has a pulse width corresponding to the transmitting duration of one bit. In this state, the output signal of the shift register 28 constantly assumes a logic level "0". Hence, after the flip-flop 19 is set responsive to the rising edge of the output pulse signal of the decoder 22, the flip-flop 19 is reset after the transmitting duration of one bit responsive to the falling edge of the output detection signal of the gate circuit 16. When the flip-flop 19 is reset, the first counter 20 is similarly reset. The operations similar to those described heretofore are thereafter repeated.

The AND circuit 17 receives the output pulse signals of the gate circuit 16 and the decoder 22, and the output signal of the inverter 26 which constantly assumes a logic level "1" during the normal reproduction. The AND circuit 17 performs a logical multiplication of the three signals supplied thereto, and produces a pulse signal having the same phase and the same waveform as the output pulse signals of the gate circuit 16 and the decoder 22. This output pulse signal of the AND circuit 17 is supplied to a shift register 29. The shift register 29 successively shifts the output pulse signal of the AND circuit 17 responsive to a shift pulse from an input terminal 30. The shift pulse is formed from an output synchronizing signal detection signal produced through an output terminal 34 which will be described later on in the specification, and has a period which is equal to the transmitting duration of one block. An N-bit parallel output signal of the shift register 29 is supplied to a gate circuit 31, where N is an integer greater than or equal to 2. N is equal to 8 or 16, for example.

The gate circuit 31 produces a detection signal having a logic level "1" only when all of the N-bit parallel outputs from the shift register 29 assume a logic level "1", that is, only when the output pulses of the gate circuit 16 and the decoder 22 continuously coincide N times for every transmitting duration of one block. This output detection signal of the gate circuit 31 having the logic level "1", is supplied to the AND circuit 18. Hence, after the output pulses of the gate circuit 16 and the decoder 22 continuously coincide N times, a detection signal which constantly assumes the logic level "1"

is produced from the gate circuit 31, excluding a case where there is a dropout in the synchronizing signal within the reproduced digital signal and excluding a case where an error in the synchronizing signal is detected by the error checking circuit 25. While the detection signal having the logic level "1" is supplied to the AND circuit 18, the AND circuit 18 passes the pulse signal from the gate circuit 16 which is in phase with the eighth bit of the reproduced synchronizing signal and has a period corresponding to the transmitting duration of one block. The output signal of the AND circuit 18 is applied to a reset terminal of a second counter 32, through an OR circuit 35, so as to reset the second counter 32.

The second counter 32 counts the pulses in the output clock signal of the PLL 15. A counted output of the second counter 32 is supplied to a decoder 33. As in the case of the decoder 22, the decoder 33 is designed to produce a pulse signal having a logic level "1" when the counted value in the counter 32 becomes equal to the number of pulses in the output clock signal of the PLL 15 which is transmitted in a duration which is equal to the transmitting duration of one block. Hence, during the normal reproduction in which the output detection signal of the gate circuit 16 and the output pulse signal of the decoder 22 continuously coincide N times for every transmitting duration of one block, the first and second counters 20 and 32 are reset by the same detection signal from the gate circuit 16 and are in synchronism with each other. As in the case of the decoder 22, the decoder 33 produces a pulse signal which has a period corresponding to the transmitting duration of one block and is in phase with the eighth bit of the reproduced synchronizing signal. The output pulse signal of the decoder 33 is produced through the output terminal 34 as the synchronizing signal detection signal. The synchronizing signal detection signal produced through the output terminal 34, is supplied as a reference signal to a circuit (not shown) which stores therein the digital data, the error checking code, and the error correcting codes within the reproduced digital signal.

The operations described heretofore are performed during the normal reproduction. Next, description will be given with respect to the operations which are performed in a case where the value of 8 continuous bits of data other than the synchronizing signal in one block is the same as the value of the synchronizing signal. In this case, a false detection signal is produced from the gate circuit 16 at a point when the data in the last bit of the 8-bit data is reproduced. This false detection signal from the gate circuit 16 is supplied to the AND circuits 17 and 18, and so the flip-flop 19 so as to reset this flip-flop 19. For this reason, the output of the decoder 22 assumes the logic level "0" immediately after the false detection signal is produced from the gate circuit 16, and the output of the AND circuit 17 accordingly assumes a logic level "0". Hence, among the N-bit parallel output of the shift register 29, one bit assumes the logic level "0", and the output signal of the gate circuit 31 assumes a logic level "0" and closes the gate of the AND circuit 18. Therefore, the AND circuit 18 blocks the supply of the false detection signal from the gate circuit 16 to the reset terminal of the counter 32. As a result, the counter 32 is not reset, and continues to count the pulses in the clock signal obtained from the PLL 15. The output of the decoder 33 is applied to the reset terminal R of the counter 32 through the OR circuit 35, to reset the counter 32. Thus, even when a false detection signal is produced from the decoder 33, the operation of the synchronizing signal detecting circuit is unaffected by the false detection signal, and the synchronizing signal detection signal having the period corresponding to the transmitting duration of one block can be constantly obtained responsive to the period with which an output is obtained from the decoder 33.

Figure 3:
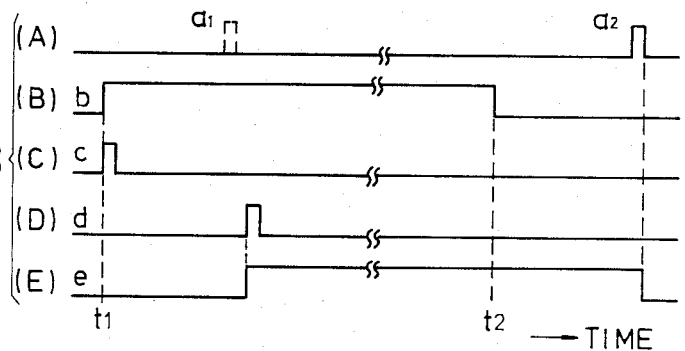
FIGS. 3(A) through 3(E) show signal waveforms at each part of the block system shown in FIG. 2.
Figure 6:
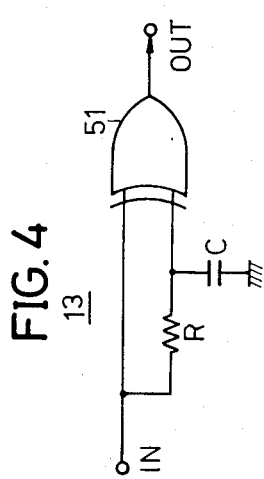
FIG. 6 shows an example of a concrete circuit of a rising (leading) edge detecting circuit in the block system shown in FIG. 2.

When a false detection signal is produced from the gate circuit 16, the counter 20 is reset responsive to this false detection signal. After the transmitting period of one block has lapsed from the point when the counter 20 is reset responsive to the false detection signal, the decoder 22 supplies a pulse signal to the flip-flop 19 so as to set the flip-flop 19. The pulse signal from the decoder 22 is applied to the error checking circuit 25 as a reset pulse. Accordingly, the error checking circuit 25 obtains therein a total of 119 bits of data immediately after the data having the same value as the fixed pattern of the synchronizing signal, and performs a predetermined dividing operation so as to obtain the remainder. In this case, the 119 bits of data are data arranged at locations different from the regular locations $D_1$ through $D_4$, $P_1$, $P_2$, and CRC shown in FIG. 1, and include the synchronizing signal of the subsequent block. For this reason, a remainder is introduced when the predetermined dividing operation is performed, and it is detected that the synchronizing signal is incorrect. Hence, the error checking circuit 25 does not supply a reset pulse to the counter 23 in this case, and the counter 23 continues to count the output pulses of the decoder 21. The data having the same fixed pattern as the synchronizing signal is not generated frequently. However, when such a data having the same fixed pattern as the synchronizing signal is generated, such a data is usually generated a plurality of times, continuously, within the transmitting period of one block. For example, when it is assumed that the data having the same fixed pattern as the synchronizing signal is generated M times, where M is an integer equal to 8, for example, the counter 23 counts the output pulses of the decoder 21 M times. Then, the counter 23 produces a pulse signal b shown in FIG. 3(B) which assumes a logic level "1" at a time $t_1$ when the counted value becomes equal to M. This pulse signal b from the counter 23 is supplied to the rising edge detecting circuit 27. As shown in FIG. 6, for example, the rising edge detecting circuit 27 comprises a data latch 81 for providing a delay of one clock pulse, an inverter 82, and an AND gate 83. The AND gate 83 performs a logical multiplication between an input pulse, and the input pulse which has been delayed in the data latch 81 by one clock pulse and has then been inverted in the inverter 82. Accordingly, a pulse signal responsive to the rising edge of the input pulse, is produced from the AND gate 83. An edge detection signal c show in FIG. 3(C) is produced from the rising edge detecting circuit 27, and is supplied to the shift register 28. On the other hand, the counter 23 supplies a signal having a logic value "1" to the inverter 26 when one output pulse of the decoder 21 is counted, so as to close the gate of the AND circuit 17 by the output of the inverter 26.

The shift register 28 receives the clock signal from the PLL 15 as a shift pulse, and delays the output pulse signal of the rising edge detecting circuit 27 by a predetermined delay time which is longer than the transmitting duration of the synchronizing signal. The shift register 28 thus produces a delayed pulse signal d shown in FIG. 3(D), and supplies this pulse signal d to the set terminal of the flip-flop 19 through the OR circuit 24. The flip-flop 19 is set responsive to the rising edge of the pulse signal d. Therefore, a Q-output e of the flip-flop 19 assumes a logic level "1" as shown in FIG. 3(E).

The shift register 28 performs the delay by the predetermined delay time because the false synchronizing signal usually exists a plurality of times within the data, continuously, within the transmitting period of one block. Unless the shift register 28 performs this delay by the predetermined delay time, the synchronizing signal detecting circuit may synchronize to the false synchronizing signal. Thus, by the predetermined time delay performed in the shift register 28, it is possible to maintain the flip-flop 19 in the reset state, even when the detection signal of the false synchronizing signal is produced from the gate circuit 16 within the predetermined delay time as indicated by a phantom line $a_1$ in FIG. 3(A). It is therefore possible to prevent the counter 20 from being reset responsive to the detection signal of the false synchronizing signal, and it is hence possible to prevent the synchronizing signal detecting circuit from synchronizing to the false synchronizing signal.

The operations described heretofore are repeated until the error checking circuit 25 finally latches the regular 119 bits of data and performs the predetermined dividing operation. When the error checking circuit 25 detects that there is no error in the synchronizing signal at a detection time $t_2$, the counter 23 is reset responsive to the detection output of the error checking circuit 25 at this detection time $t_2$. As a result, the counted output signal b of the counter 23 assumes a logic level "0" at the time $t_2$ as shown in FIG. 3(B). Further, in a transmitting duration of the last bit of the synchronizing signal in the subsequent block, after a transmitting duration of 11 bits has lapsed from the time $t_2$, a correct synchronizing signal detection signal is produced from the gate circuit 16 as indicated by a solid line $a_2$ in FIG. 3(A). The flip-flop 19 is reset responsive to the falling edge of this correct synchronizing signal detection signal, and the signal e which assumes a logic level "0" as shown in FIG. 3(E) is produced through the Q-output terminal of the flip-flop 19. The counter 20 is reset responsive to the falling edge of this Q-output e of the flip-flop 19.

When the counter 20 is again reset and the synchronizing signal is thereafter reproduced continuously for N times, the output of the gate circuit 31 again assumes the logic level "1". As a result, the gate of the AND circuit 18 is opened so that the output detection signal of the gate circuit 16 can pass through the AND circuit 18. Moreover, the counter 32 is reset responsive to the output detection signal of the gate circuit 16. Accordingly, from the time $t_1$ to the time when the the counter 32 is reset, the synchronizing signal detection signal obtained from the decoder 33, is a signal which has a period corresponding to the transmitting duration of one block and is obtained by counting the pulses in the output clock signal of the PLL 15 based on the output detection signal of the gate circuit 16 obtained immediately prior to the time $t_1$. On the other hand, after the time when the counter 32 is reset, the synchronizing signal detection signal obtained from the decoder 33 is a signal in phase with the output detection signal of the gate circuit 16 during the normal reproduction.

Next, description will be given with respect to the operations performed in a case where a dropout exists in a part of the synchronizing signal within the digital signal. In this case, the pulse signals having the same period as the transmitting period of one block, are produced from the decoders 21 and 22 similarly as in the case at the time of the normal reproduction. However, the gate circuit 16 does not produce a detection signal in this case. For this reason, the output signal of the AND circuit 17 assumes a logic level "0", and the output signal of the gate circuit 31 also assumes a logic level "0". Accordingly, similarly as in the case where the false detection signal is produced, the counter 32 continues to count the pulses in the clock signal, and produces a synchronizing signal detection signal after the transmitting period of one block has elapsed from a time immediately prior thereto when the true synchronizing signal was detected in the decoder 33. Hence, it is possible to compensate for a dropout in a part of the synchronizing signal.

In the embodiment described heretofore, the digital signal is recorded on the disc, and the synchronizing signal detecting circuit according to the present invention is applied to an apparatus which plays the disc. However, the synchronizing signal detecting circuit according to the present invention may also be applied to a case where the digital signal is recorded on other types of recording mediums such as a magnetic tape. In addition, the signal format of the digital signal is not limited to the signal format shown in FIG. 1.

Further, the present invention is not limited to these embodiments, but various variations and modifications may be made without departing from the scope of the present invention.

What is claimed is:

1. A synchronizing signal detecting circuit in a digital signal transmitting system which transmits a digital signal in which signals are time-sequentially multiplexed in terms of blocks, each of said blocks being made up of digital data which are information signals subjected to a digital modulation, a synchronizing signal having a fixed pattern, and an error checking code arranged at a location separated from a location of said synchronizing signal by a predetermined number of bits, said synchronizing signal detecting circuit comprising:

a first detecting circuit supplied with said digital signal, for detecting a signal having the same fixed pattern as said synchronizing signal within the digital signal;

an error checking circuit for essentially detecting whether said synchronizing signal is correct by use of the error checking code within the digital signal at a point which is a transmitting duration of said predetermined number of bits after a point when a detection signal was produced from said first detecting circuit;

extracting means for extracting a clock signal from said digital signal;

a first counter for counting pulses in the clock signal which is extracted in said extracting means;

first decoder means for producing from a counted output of said first counter a signal having a period which is substantially equal to a period of a signal of one block;

counting means reset responsive to an output signal of said error checking circuit when said error checking circuit detects that said synchronizing signal is correct, for counting pulses in a signal which is obtained from an output signal of said first counter and has a period which is substantially equal to the period of the signal of one block;

delay means supplied with a counted output of said counting means, for producing a pulse signal which has been delayed by a predetermined delay time from a point when the counted output of said counting means becomes equal to M, where M is a natural number greater than or equal to 2;

resetting means for resetting said first counter responsive to the output detection signal of said first detecting circuit immediately after said delay means produces an output pulse signal or immediately after said first decoder produces an output signal;

a second detecting circuit for detecting that the output signals of said first detecting circuit and said first decoder means continuously coincide for N times for every period of the signal of one block in a state where the value of the counted output of said counting means is zero, where N is a natural number greater than or equal to 2;

a second counter reset responsive to the output detection signal of said first detecting circuit in a duration in which a detection signal is produced from said second detecting circuit, for counting pulses in said clock signal; and second decoder means for decoding a counted output of said second counter, and for producing a synchronizing signal detection signal.

2. A synchronizing signal detecting circuit as claimed in claim 1 in which said first decoder means comprises a first decoder supplied with the counted output of said first counter, for producing a pulse signal which has a period substantially equal to the period of the signal of one block and is in phase with a last bit of said error checking code in said digital signal, and a second decoder supplied with the counted output of said first counter, for producing a pulse signal which has a period substantially equal to the period of the signal of one block and is in phase with a last bit of said synchronizing signal in said digital signal, said counting means counts the output pulse signal of said first decoder supplied thereto, and said resetting means and said second detecting circuit respectively receive the output pulse signal of said second decoder.

3. A synchronizing signal detecting circuit as claimed in claim 2 in which said resetting means comprises an OR circuit supplied with the outputs of said delay means and said second decoder, and a flip-flop having a reset terminal supplied with the output of said first detecting circuit and a set terminal supplied with an output of said OR circuit, and said flip-flop supplies a Q-output thereof to a reset terminal of said first counter.

4. A synchronizing signal detecting circuit as claimed in claim 1 which further comprises an AND circuit supplied with the output detection signal of said first detecting circuit and the output detection signal of said second detecting circuit, and an OR circuit supplied with outputs of said AND circuit and said second decoder means, for supplying an output signal thereof to a reset terminal of said second counter so as to reset said second counter.

5. A synchrnizing signal detecting circuit as claimed in claim 2 which further comprises an inverter supplied with a least significant bit of the output of said counting means, and an AND circuit supplied with outputs of said inverter and said second decoder, for supplying an output signal thereof to said second detecting circuit.

* * * * *